B. R. BENJAMIN.
TWINE TENSION DEVICE FOR HARVESTERS, SHOCKERS, AND THE LIKE.
APPLICATION FILED JUNE 12, 1913.

1,211,815.

Patented Jan. 9, 1917.
2 SHEETS—SHEET 1.

Witnesses:
C. C. Palmer

Inventor
Bert R. Benjamin.
by Chas. E. Lord
Atty.

B. R. BENJAMIN.
TWINE TENSION DEVICE FOR HARVESTERS, SHOCKERS, AND THE LIKE.
APPLICATION FILED JUNE 12, 1913.
1,211,815.
Patented Jan. 9, 1917.
2 SHEETS—SHEET 2.
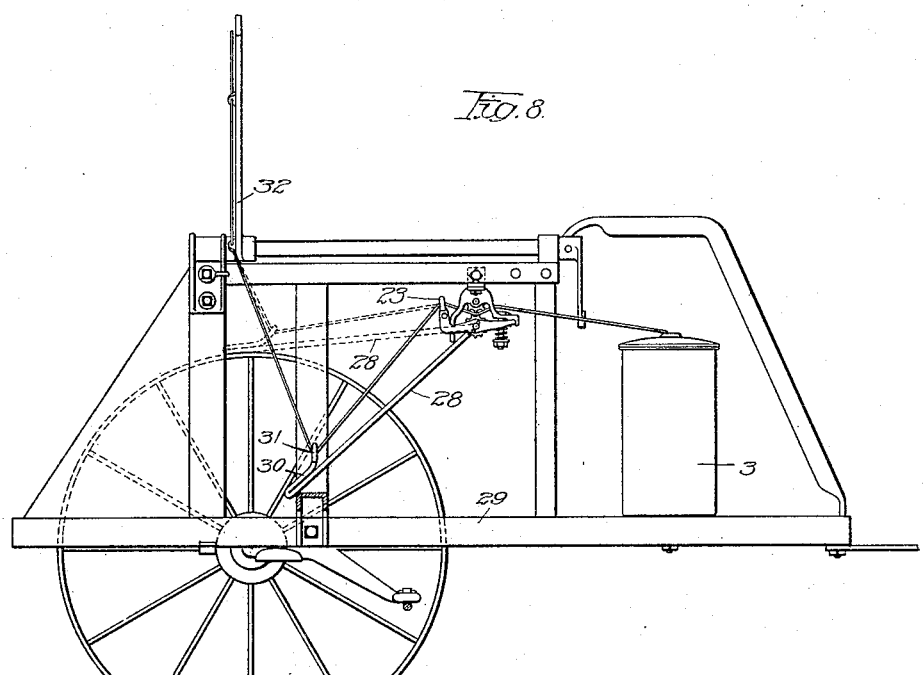
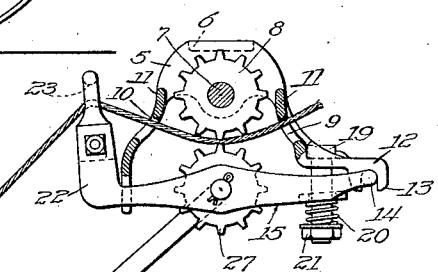
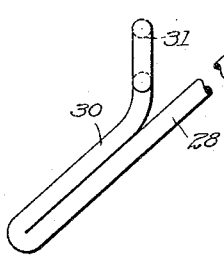
Witnesses:
Inventor:
Bert R. Benjamin.

UNITED STATES PATENT OFFICE.

BERT R. BENJAMIN, OF OAK PARK, ILLINOIS, ASSIGNOR TO INTERNATIONAL HARVESTER COMPANY OF NEW JERSEY, A CORPORATION OF NEW JERSEY.

TWINE-TENSION DEVICE FOR HARVESTERS, SHOCKERS, AND THE LIKE.

1,211,815. Specification of Letters Patent. Patented Jan. 9, 1917.

Application filed June 12, 1913. Serial No. 773,191.

*To all whom it may concern:*

Be it known that I, BERT R. BENJAMIN, a citizen of the United States, residing at Oak Park, in the county of Cook and State of Illinois, have invented certain new and useful Improvements in Twine-Tension Devices for Harvesters, Shockers, and the like, of which the following is a full, clear, and exact specification.

My invention relates to twine tension devices for harvesters, shockers and the like.

It has for its object to maintain the twine supplied to the binding needle of the machine at the proper tension during all stages of the binding operation in such a manner that while all deleterious slack is removed, the needle is free to move at all times. I attain this object by providing an improved twine guiding and tensioning device normally retarding the free passage of the twine and maintaining the same under tension, yet automatically operable when a pull is exerted upon the twine to release the latter and permit the same to pass freely to the needle.

In order that my invention may be fully and clearly disclosed, I have illustrated two embodiments of the same in the accompanying drawings. It is to be understood, however, that both the embodiments shown herein are susceptible of modification.

Figure 1:
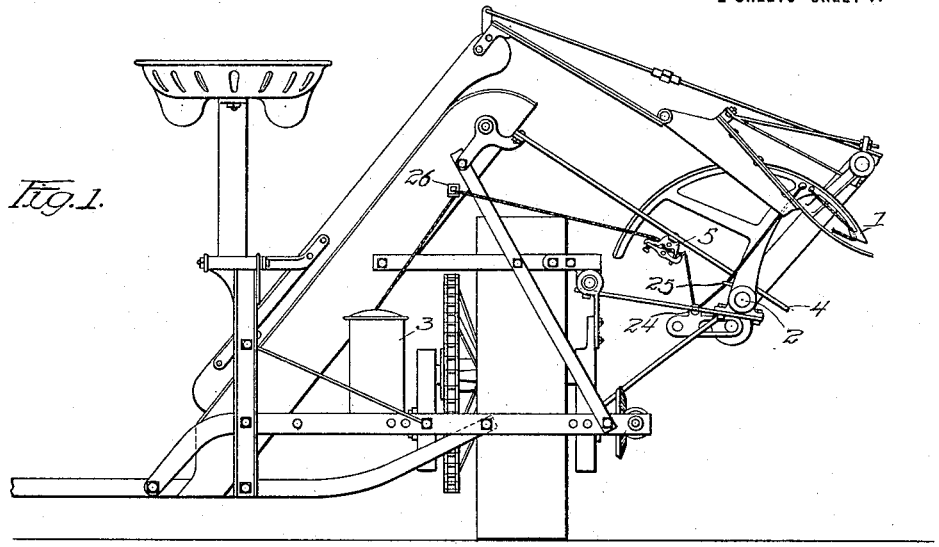
Figure 2:
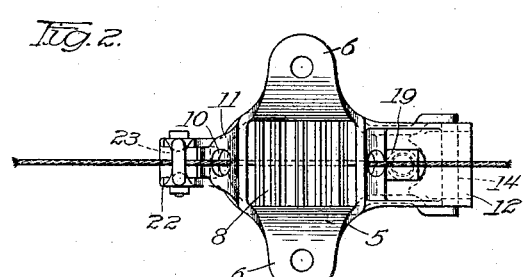
Figure 3:
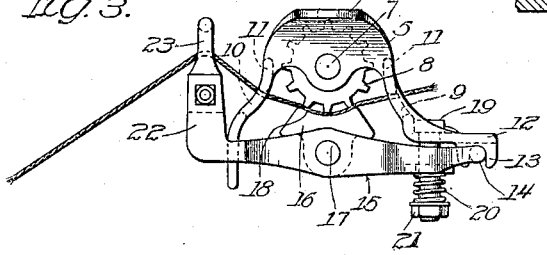
Figure 5:
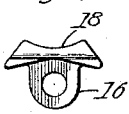
Figure 6:
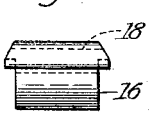
Figure 7:
Figure 4:
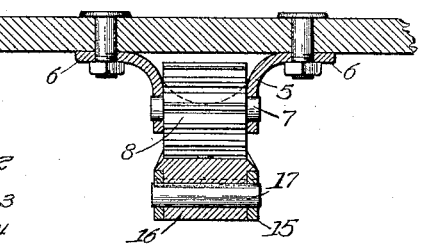

Figure 1 is a rear elevation of a binder equipped with one form of my improvement. Fig. 2 is a top plan view of the twine tension. Fig. 3 is a side elevation of the twine tension. Fig. 4 is a partial sectional view of the same showing the lower holding member in section. Figs. 5, 6 and 7 are detail views of parts of the mechanism. Fig. 8 is a side elevation of a shocker with a modified form of my improvement thereon. Fig. 9 is a side elevation partially in section of the form of tension shown in Fig. 8.

In the construction shown in Figs. 1 to 7 inclusive, I have illustrated a binder of standard construction having a needle 1 carried on the usual needle shaft 2 and adapted to coöperate in the usual manner with any standard form of knotter mechanism (not shown) drawing the twine from a twine receptacle 3; an improved twine guide and tension being carried beneath the binder deck 4 and coöperating with this needle in a manner hereinafter described.

As shown in Figs. 2 and 3, this twine tension comprises a frame 5 having parallel sides and a flat base provided with laterally extending lugs 6 by which it is attached to the under side of the binder deck 4 through any suitable means. The sides of this frame preferably protrude substantially vertically downward and act as supports for a spindle 7 carrying a tension wheel or pinion 8. At points opposite each other and the lower half of this pinion, suitable twine openings 9 and 10 are provided in webs 11 connecting the side walls of the frame 5, these openings being preferably substantially oval in shape as shown and provided with rounded edges so that the twine may not be frayed in its passage therethrough. As shown in Figs. 1 and 3, the web 11 at the end farthest removed from the needle is provided with a longitudinally disposed extension 12 in which is journaled between suitable projections 13, the rear end 14 of a substantially L-shaped tensioning lever 15. Intermediate the ends of this lever and beneath the pinion 8, mounted in the frame 5, a coöperating twine tension member 16 is journaled in the member 15 on a suitable spindle 17, this member being provided with a smooth concave upper surface 18 adapted to coöperate with certain of the teeth on the pinion 8 in holding the twine. As shown in Fig. 3, a vertically extending bolt 19 is protruded through both the extension 12 on the bracket 5 and the end of the member 15 at a point adjacent the pivot of the latter; a coiled spring 20, the tension of which is adjustable by a nut 21, being provided on the lower end of the bolt to hold the member 15 normally in elevated position. Further, in order to guide the twine as it passes out of the opening 10, the upstanding end 22 of the member 15 is provided with a twine guiding eyelet 23; this eyelet normally being held by the spring in a plane above the pivot 14, as shown in Fig. 3. The operation of the construction shown in these figures is as follows: When the twine is drawn off by the needle 1 as it rotates with its shaft 2, the member 15 is forced downward by the twine about its pivot 14 on the frame 5 and against the pressure of the spring 20 in such a manner as to lower the tension member 16 and release the twine so that the same may be drawn freely from the twine box 3 during the binding operation. As soon as this operation is completed, that is, as soon as the needle moves back to its normal position beneath the binder deck, the tension exerted by it upon the twine will then be relieved and the spring 20 will act immediately to raise the lever 15 and again clamp the twine between the teeth of the pinion 8 and the concave surface of the member 16. Obviously, any suitable means, such as guides 24 and 25, upon the needle mechanism and a guide 26 upon the binder frame may be provided to assist in the free passage of the twine from the twine box to the needle.

In Figs. 8 and 9, I have illustrated a modification of the construction shown in Figs. 1 to 7. It is to be noted that in this construction the frame 5 and the rocking lever 15 are of the identical construction heretofore described, but that instead of using a concave member 16 coöperating with the pinion, I use a second pinion 27, this pinion being journaled in the member 15 in the same position as was the concave member 16 and preferably out of mesh with the pinion 8 as shown. Further, in this construction I employ an elongated depending slack absorbing or tension rod 28 which forms a spindle for the pinion 27 and extends downward and at an angle therefrom to a point adjacent the bottom frame 29 of the shocker, where it is provided with a hooked end 30 having an eyelet 31 therein through which the twine passes up to the shocker binding needle 32. The operation of the construction shown in these figures is substantially the same as that described in connection with Figs. 1 and 7, the member 15 being rocked about its pivot to depress the pinion 27 and release the twine when the needle 32 is operated and the tension member 28 is drawn to the dotted line position shown in Fig. 8, preferably limited in its movement by striking a fixed part of the supporting frame 5. It is to be noted that in this position the twine guide 31 on the member 28 is below the twine guide 23 so that when the needle draws off the twine, the upper end of the member 15 must of necessity be depressed to lower the pinion 27 and free the twine. Obviously, as soon as the binding operation is completed and the needle 32 thrown back, as in the case of the construction shown in Figs. 1 to 7, the spring 20 will act immediately and automatically to cause the twine to be again gripped between the teeth of the pinions 8 and 27 and the member 28 will fall downward of its own weight to take up the slack.

It is to be noted that in my improvement, means are provided which normally hold the twine under tension and are only freed when a pull is exerted upon the twine during the operation of the binding mechanism. It is further to be noted that when the binding mechanism is operated, the twine is immediately drawn forward as the first tension placed upon the twine serves to free it from the tension device. Attention is further directed to the fact that the construction shown is exceedingly simple and of a type which may be readily and cheaply manufactured at small expense and adapted to use in connection with binders, shockers and like devices of standard construction.

While I have in this application described one form which my invention may assume in practice, it is to be understood that the forms shown herein for purposes of illustration may be modified without departing from the spirit of my invention.

What I claim as my invention and desire to secure by Letters Patent is:

1. In a twine tension device, twine gripping means releasable upon tension being applied to the twine, and a coöperating normally operative slack absorbing member acting upon the twine drawn through said twine gripping means and movable with the movable element of said releasable means when the twine is put under tension.

2. In a twine tension device, a frame, a spring-held swinging twine guiding lever pivotally mounted thereon, coöperating twine gripping members carried on said frame and lever normally gripping the twine, and a swinging slack absorbing member carried on said lever and protruding longitudinally forward and downward with respect to said lever.

3. In a twine tensioning device for harvesters and the like, a frame, a rotary member journaled in said frame, a lever pivoted to said frame and disposed horizontally beneath said rotary member, resilient means normally holding said lever in elevated position, a member carried by said lever normally coöperating with said rotary member to position and grip the twine, and a twine guide carried at one end of said lever extending into a plane a considerable distance above the lowest point on the periphery of said rotary member so as to deflect the twine positively to one side of a straight line so that when tension is applied to the twine tending to return it to a straight line the lever will be depressed to release the grip upon the twine.

4. In a twine tensioning device for harvesters and the like, a frame having twine openings in its opposite ends and depending portions disposed substantially at right angles to each other, one of said portions having spaced depending lugs thereon and the other having a slot therein, a substantially L-shaped rocking lever journaled between said lugs and having its horizontal portion movable in said slot, resilient means carried on said frame at one side of said lugs normally holding said lever in elevated position, coöperating twine gripping members carried on said frame and rocking lever, and a twine guide formed on the upright leg of said lever having a twine opening disposed above the pivot of said lever and in alinement with the openings in said frame.

5. In a twine tensioning device for harvesters and the like, a frame, a rotary member journaled in the side walls of said frame, a lever pivoted to said frame and disposed horizontally beneath said rotary member, resilient means normally holding said lever in elevated position, a member carried by said lever normally coöperating with said rotary member to position the twine, a twine guide carried at one end of said lever extending into a plane above the lowest point on the periphery of said rotary member, and a twine tensioning member pivoted to said lever and protruding at an angle therefrom.

6. In a twine tensioning device for harvesters and the like, a frame, a rotary member journaled in the side walls of said frame, a lever pivoted to said frame and disposed horizontally beneath said rotary member, resilient means normally holding said lever in elevated position, a member carried by said lever normally coöperating with said rotary member to position the twine, a twine guide carried at one end of said lever and extending into a plane above the pivot of said lever upon the frame, and a twine tensioning member pivoted to said lever and protruding at an angle therefrom, one end of said tensioning member serving as a spindle for the twine positioning member carried by said lever.

In testimony whereof I affix my signature, in the presence of two witnesses.

BERT R. BENJAMIN.

Witnesses:
RAY D. LEE,
H. L. ROCKWELL.

Copies of this patent may be obtained for five cents each, by addressing the "Commissioner of Patents, Washington, D. C."